US010220433B2

United States Patent
Kimura et al.

(10) Patent No.: US 10,220,433 B2
(45) Date of Patent: Mar. 5, 2019

(54) METHOD OF MANUFACTURING DOOR CHANNEL

(71) Applicant: SHIROKI CORPORATION, Fujisawa-shi, Kanagawa (JP)

(72) Inventors: Jun Kimura, Fujisawa (JP); Jun Makita, Novi, MI (US)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 113 days.

(21) Appl. No.: 15/353,478

(22) Filed: Nov. 16, 2016

(65) Prior Publication Data

US 2018/0133777 A1 May 17, 2018

(51) Int. Cl.
*B21D 53/74* (2006.01)
*B21D 53/88* (2006.01)
*B60J 5/00* (2006.01)

(52) U.S. Cl.
CPC ............... *B21D 53/88* (2013.01); *B60J 5/00* (2013.01)

(58) Field of Classification Search
CPC ........................... B21D 53/74; Y10T 29/49622
See application file for complete search history.

(56) References Cited

U.S. PATENT DOCUMENTS

| | | | | |
|---|---|---|---|---|
| 4,433,600 A | * | 2/1984 | Ikeda | B23D 15/002 |
| | | | | 144/217 |
| 4,483,227 A | * | 11/1984 | Camisa | B23D 15/002 |
| | | | | 144/217 |
| 4,932,450 A | * | 6/1990 | Baker | B27C 5/006 |
| | | | | 144/147 |
| 2005/0279201 A1 | * | 12/2005 | Chang | B26D 3/10 |
| | | | | 83/589 |
| 2006/0130624 A1 | * | 6/2006 | Bocaccio | B29C 67/0044 |
| | | | | 83/14 |
| 2012/0017413 A1 | * | 1/2012 | Carter | B62D 65/06 |
| | | | | 29/428 |
| 2015/0352622 A1 | * | 12/2015 | Shimizu | B21D 53/34 |
| | | | | 72/327 |

FOREIGN PATENT DOCUMENTS

JP     2002-321530 A     11/2002

* cited by examiner

*Primary Examiner* — Sean Michalski
*Assistant Examiner* — Fernando Ayala
(74) *Attorney, Agent, or Firm* — Buchanan Ingersoll & Rooney PC

(57) ABSTRACT

A method of manufacturing a door channel is provided. The door channel is provided in a space defined between an inner panel and an outer panel of a vehicle door and has an outside wall and a connection wall connected to the outside wall. The method includes: (a) disposing the door channel in a die; and (b) forming a cut portion in a corner portion of the door channel by punching the corner portion by a punch. The cut portion includes: a first cut portion formed in a corner portion of the outside wall; and a second cut portion formed in a corner portion of the connection wall and communicating with the first cut portion. By the first cut portion, a first cut surface and a second cut surface facing each other are formed on the outside wall. In the step (b), the first cut portion and the second cut portion are formed by a single punching.

5 Claims, 4 Drawing Sheets

METHOD OF MANUFACTURING DOOR CHANNEL

BACKGROUND

1. Technical Field

The present disclosure relates to a method of manufacturing a door channel. In particular, the present disclosure relates to a method of manufacturing a door channel provided in a space defined between an inner panel and an outer panel of a vehicle door.

2. Related Art

JP-A-2002-321530 discloses a door channel. The door channel is disposed in a panel space defined by an inner panel and an outer panel, and is provided with an outside wall facing the outer panel, an inside wall facing the inner panel, and a connection wall provided between the outside wall and the inside wall and connected to the outside wall and the inside wall.

To suppress interference between the door channel and another member, it is necessary to form a cut portion in a corner portion of the door channel by cutting the corner portion of the door channel. The cut portion is formed in such a manner as to reach from the outside wall to part of the connection wall.

According to a related art (not an art known to the public), as shown in FIG. 3, punching using a punch and a die is performed twice to thereby form a cut portion in the corner portion of the door channel. Specifically, as shown in FIG. 3, the corner portion of the outside wall of the door channel is punched frontward, and then, the corner portion of the connection wall of the door channel is punched downward, whereby a cut portion is formed in the corner portion of the door channel.

However, according to the related art, since it is necessary to perform punching twice to form the cut portion, the process of manufacturing the door channel increases, and the manufacturing cost of the door channel increases.

SUMMARY

The present disclosure is mainly directed to simplifying the door channel manufacturing method.

According to one or more aspects of the present disclosure, a method of manufacturing a door channel is provided. The door channel is provided in a space defined between an inner panel and an outer panel of a vehicle door and has an outside wall and a connection wall connected to the outside wall.

The method comprises:

(a) disposing the door channel in a die; and (b) forming a cut portion in a corner portion of the door channel by punching the corner portion by a punch.

The cut portion includes:

a first cut portion formed in a corner portion of the outside wall; and a second cut portion formed in a corner portion of the connection wall and communicating with the first cut portion.

By the first cut portion, a first cut surface and a second cut surface facing each other are formed on the outside wall.

In the step (b), the first cut portion and the second cut portion are formed by a single punching According to the above-described manufacturing method, since the first cut portion and the second cut portion are formed by a single punching using a punch, the method of manufacturing the door channel can be simplified. As described above, increase in the manufacturing cost of the door channel can be suppressed in addition to the suppression of interference between the door channel and another member.

According to another aspect of the present disclosure, the first cut surface and the second cut surface may be parallel to each other.

According to the above-described manufacturing method, since the first cut surface and the second cut surface are parallel to each other, interference between the door channel and another member can be appropriately suppressed.

According to another aspect of the present disclosure, a distance between the first cut surface and the second cut surface may gradually decrease along a movement direction of the punch.

According to the above-described manufacturing method, since the distance between the first cut surface and the second cut surface gradually decreases along the movement direction of the punch, interference between the door channel and another member can be appropriately suppressed.

According to another aspect of the present disclosure, the corner portion of the outside wall and the corner portion of the connection wall may be curved, and the first cut portion may be formed in an entire area of the corner portion of the outside wall.

According to the above-described manufacturing method. since the first cut portion is formed in the entire area of the curved corner portion of the outside wall, interference between the door channel and another member can be appropriately suppressed.

According to another aspect of the present disclosure, in the step (b), the corner portion of the door channel is punched from an inside of the door channel by the punch.

According to the above-described manufacturing method, the door channel can be surely fixed to the die.

DETAILED DESCRIPTION OF THE INVENTION

Figure 1:
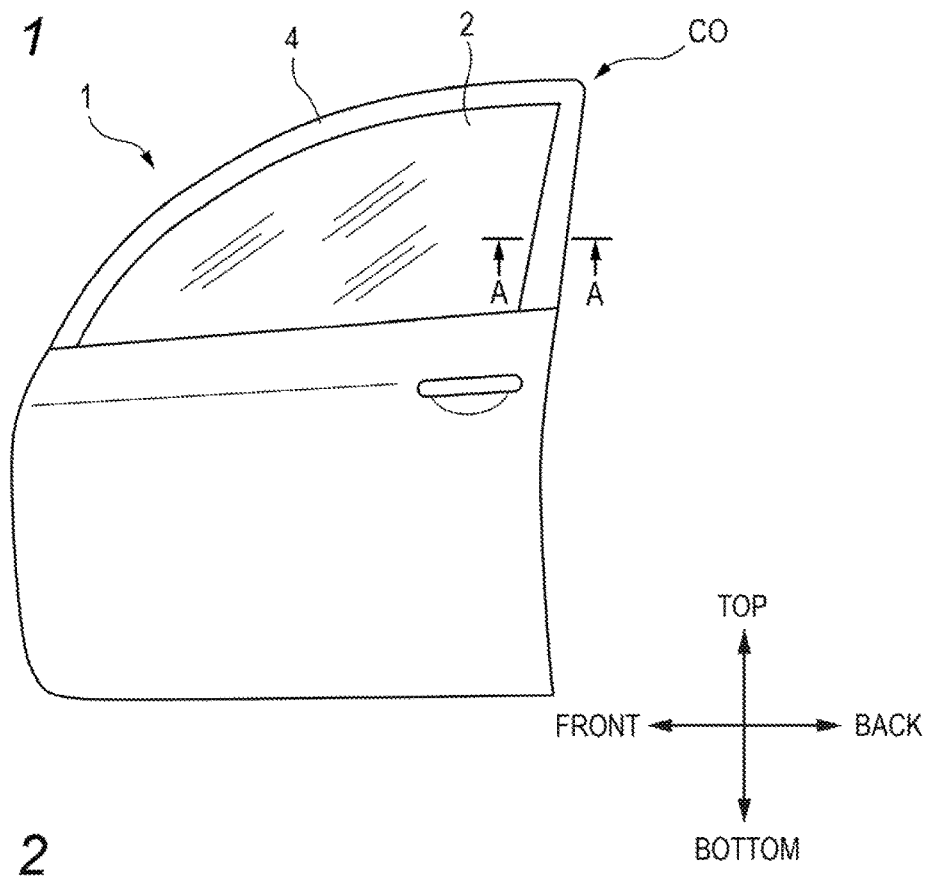
FIG. 1 is a front view of an example of a vehicle door.

Hereinafter, an embodiment of the present disclosure (hereinafter, referred to merely as present embodiment) will be described with reference to the drawings. Descriptions of members having reference designations the same as the members already described in the description of the present embodiment are omitted for convenience of explanation. Moreover, dimensions of members shown in the drawings are sometimes different from the actual dimensions of the members for convenience of explanation.

(Related Art)

Figure 2:
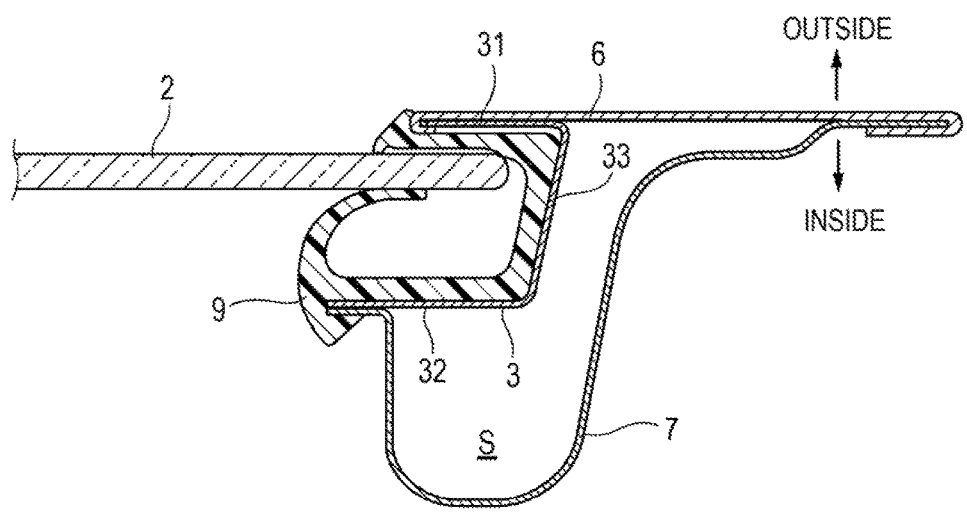
FIG. 2 is an A-A cross-sectional view of a door panel shown in FIG. 1.
Figure 3:
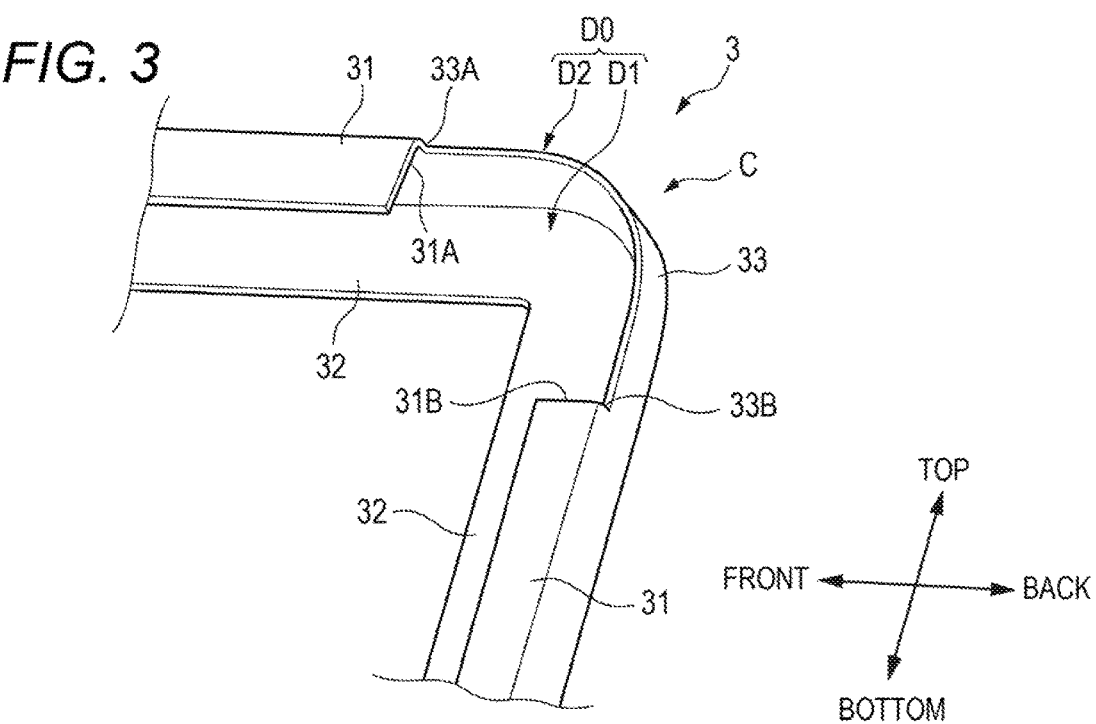
FIG. 3 is a perspective view showing the neighborhood of the corner portion of the door channel according to the related art.

First, referring to FIGS. 1 to 3, the door channel 3 according to the related art (not an art known to the public) will be described. FIG. 1 is a front view of an example of a vehicle door 1 (hereinafter, referred to merely as door 1). FIG. 2 is an A-A cross-sectional view of a door panel 4 shown in FIG 1. FIG. 3 is a perspective view showing the neighborhood of a corner portion C of the door channel 3 according to the related art.

As shown in FIG. 1, the vehicle door 1 is provided with door glass 2 and the door panel 4 configured to guide the vertical movement of the door glass 2. As shown in FIG. 2, the door panel 4 is provided with an outer panel 6 facing the outside of the vehicle where the door 1 is provided and an inner panel 7 facing the inside (interior side) of the vehicle. In a space S defined between the inner panel 7 and the outer panel 6, a resin member 9 and the door channel 3 are provided. The resin member 9 is configured to guide the vertical movement of the door glass 2 and seal the outer peripheral part of the door glass 2. The door channel 3 is configured to support the resin member 9, and is made of, for example a metal material. The cross section of the door channel 3 is substantially U-shaped as shown in FIG. 2. The door channel 3 has an outside wall 31 facing the outer panel 6, an inside wall 32 facing the inner panel 7 and a connection wall 33 connected to the outside wall 31 and the inside wall 32. The outside wall 31, the inside wall 32 and the connection wall 33 are integrally formed. The outside wall 31 and the inside wall 32 face each other with a predetermined space in between. One end of the outside wall 31 and one end of the connection wall 33 are connected together, and one end of the inside wall 32 and the other end of the connection wall 33 are connected together. The outside wall 31 and the inside wall 32 may be fixed to the outer panel 6 and the inner panel 7, respectively. The other end of the outside wall 31 is supported by a bent portion 61 of the outer panel 6.

As shown in FIG. 3, a cut portion D0 is formed in the corner portion C of the door channel 3 according to the related art. Here, the position of the corner portion C of the door channel 3 coincides with the position of a corner portion C0 of the door 1 shown in FIG. 1, and the corner portions C and C0 are both curved. The cut portion D0 has a cut portion D1 formed in the corner portion of the outside wall 31 and a cut portion D2 formed in the corner portion of the connection wall 33. Here, the position of the corner portion of the outside wall 31 and the position of the corner portion of the connection wall 33 coincide with the position of the corner portion C of the door channel 3. The corner portions of the outside wall 31 and the connection wall 33 are both curved. By the cut portion D1, a cut surface 31A and a cut surface 31B orthogonal to each other are formed on the outside wall 31. Likewise, by the cm portion D2, a cut surface 33A and a cut surface 33B orthogonal to each other are formed on the connection wall 33. The cut surface 31A and the cut surface 33A are flush with each other, and the cut surface 31B and the cut surface 33B are flush with each other. By providing the cut portion D0 in the corner portion C of the door channel 3, interference between the door channel 3 and another member (for example, the resin member 9) can be suppressed. Moreover, when the cut portion D1 is absent, the outer panel 6 is adversely affected by a wrinkle caused in the corner portion of the outside wall 31 under a condition where the bent portion 61 of the outer panel 6 holds the corner portion of the outside wall 31. As described above, such a situation can be prevented by providing the cut portion D1.

As described above, in the door channel 3 according to the related art, punching using a punch 5 and a die 8 (see FIG. 7B) is performed twice to thereby form the cut portion D0 in the corner portion C. Specifically, the corner portion of the outside wall 31 is punched frontward, and then, the corner portion of the connection wall 33 is punched downward, whereby the cut portion D0 is formed in the corner portion C of the door channel 3. As described above, according to the related art, since it is necessary to perform punching twice to form the cut portion D0 of the door channel 3, the process of manufacturing the door channel 3 increases, and the manufacturing cost oldie door channel 3 increases.

(Present Embodiment)

Figure 4:
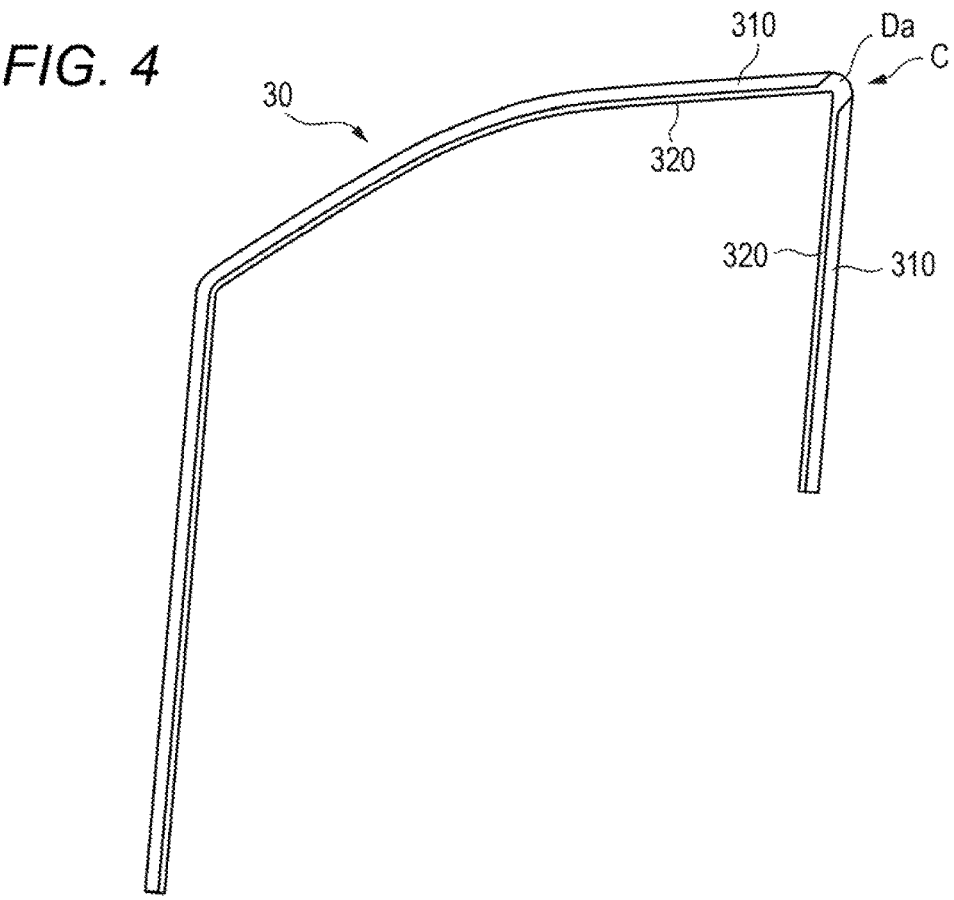
FIG. 4 is a plan view showing the whole of a door channel according to the present embodiment.
Figure 5:
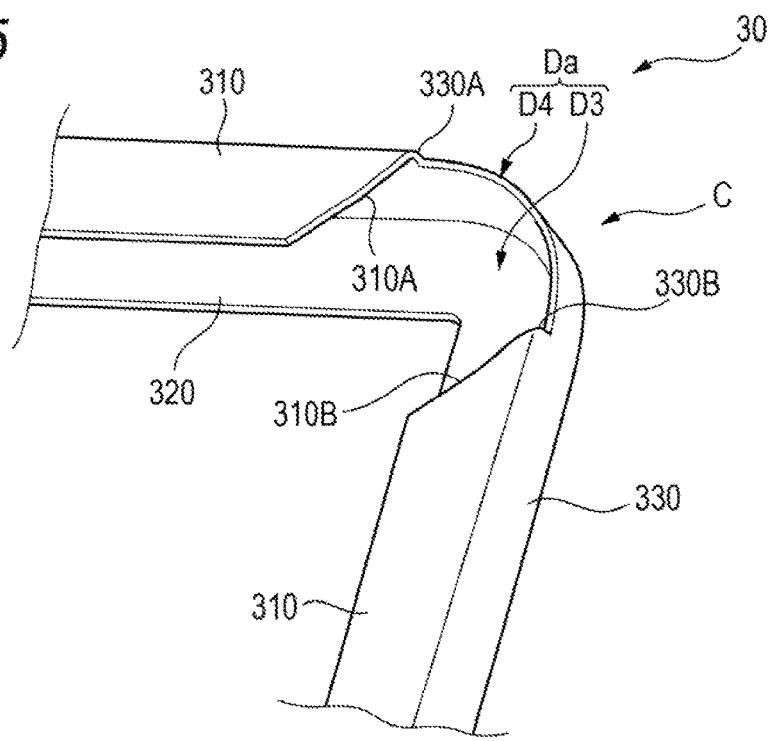
FIG. 5 is a perspective view showing the neighborhood of a corner portion of the door channel according to the present embodiment.
Figure 6:
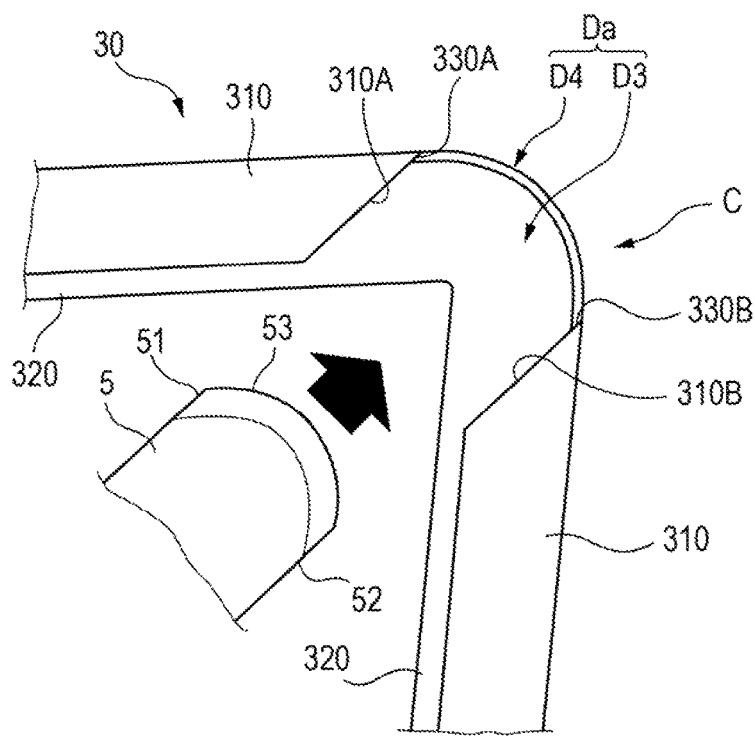
FIG. 6 is a plan view showing a tip portion of a punch used when a cut portion is formed in the corner portion of the door channel and the door channel where the cut portion is formed in the corner portion.
Figure 7A:
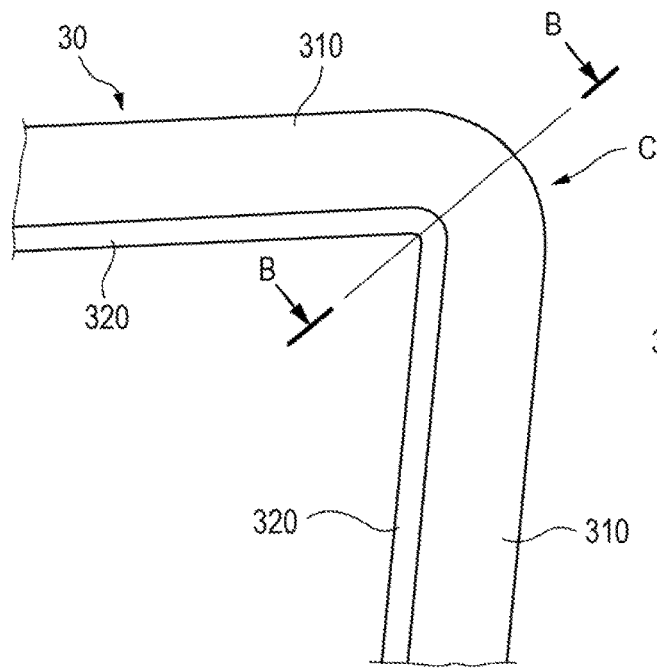
FIG. 7A is a plan view showing the door channel before the cut portion is formed in the corner portion.
Figure 7B:
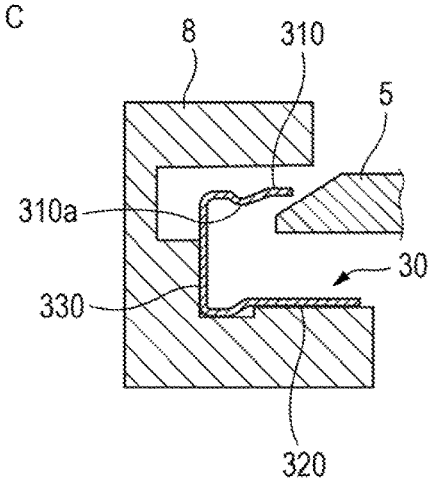
FIG. 7B is a cross-sectional view taken on line B-B (see FIG. 7A) showing the condition immediately before the corner portion of the door channel shown in FIG. 7A disposed in a die is punched by the punch.

A method of manufacturing a door channel according to the present embodiment is directed to solving the above-mentioned problem. Hereinafter, the structure of a door channel 30 according to the present embodiment will be described with reference to FIGS. 4 and 5, and a method of manufacturing the door channel 30 according to the present embodiment will be described with reference to FIGS. 6 to 7B. FIG. 4 is a plan view showing the whole of the door channel 30 according to the present embodiment. FIG. 5 is a perspective view showing the neighborhood of the corner portion C of the door channel 30 according to the present embodiment. FIG. 6 is a plan view showing the tip portion of the punch 5 used when a cut portion Da is formed in the corner portion C of the door channel 30 and the door channel 30 where the cut portion Da is formed (in FIG. 6, the illustration of the die 8 is omitted for convenience of explanation). FIG. 7A is a plan view showing the door channel 30 before the cut portion Da is formed in the corner portion C. FIG. 7B is a cross-sectional view taken on line B-B (see FIG. 7A) showing the condition immediately before the corner portion C of the door channel 30 disposed in the die 8 is punched by the punch 5.

As shown in FIG. 4, the door channel 30 according to the present embodiment has an outside wall 310, an inside wall 320 and a connection wall 330 (see FIG. 5) connected to the outside wall 310 and the inside wall 320. The door channel 30 according to the present embodiment is different from the door channel 3 according to the related art in that the shape of the cut portion formed in the corner portion C is different. Therefore, in the following, the structure of the door channel 30 different from that of the door channel 3 according to the related art will be described.

As shown in FIG. 5, the cut portion Da is formed in the covered corner portion C of the door channel 30. The cut portion Da has a cut portion D3 (first cut portion) formed in the curved corner portion of the outside wall 310 and a cut portion. D4 (second cut portion) formed in the curved corner portion of the connection wall 330. By the cut portion D3, a cut surface 310A (first cut surface) and a cut surface 310B (second cut surface) facing each other are formed on the outside wall 310. Likewise, by the cut portion D4, a cut surface 330A and a cut surface 330B facing each other are formed on the connection wall 330. The cut surface 310A and the cut surface 330A are flush with each other, and the cut surface 310B and the cut surface 330B are flush with each other. In particular, the cut surface 310A and the cut surface 310B are parallel to each other, and the cut surface 330A and the cut surface 330B are parallel to each other. According to this, interference between the door channel 30 and another member (for example, the resin member 9) can be appropriately suppressed.

Moreover, the cut portion D3 is formed in the entire area of the curved corner portion of the outside wall 310, and the cut portion D4 is formed in the entire area of the curved corner portion of the connection wall 330. In other words, the cut surface 330A is not situated on the curved connection wall 330, and the cut surface 330B is not situated on the curved connection 330. According to this, interference between the door channel 30 and another member (for example, the resin member 9) can be appropriately suppressed.

Next, as shown in FIG. 6, the shape of the cut surface 310A of the outside wall 310 when viewed two-dimensionally coincides with the shape of a side surface 51 of the tip portion of the punch 5 when viewed two-dimensionally, and the shape of the cut surface 310B of the outside wall 310 when viewed two-dimensionally coincides with the shape of a side surface 52 of the tip portion of the punch 5 when viewed two-dimensionally. That is, in the present embodiment, since the side surfaces 51 and 52 of the tip portion of the punch 5 are parallel to each other, the cut surface 310A and the cut surface 310B become parallel to each other. The arrow shown in FIG. 6 is the movement direction of the punch 5. By moving the punch 5 in this movement direction, the cut portion Da is formed in the corner portion C of the door channel 30. Specifically, by the side surfaces 51 and 52 of the punch 5, the cut portion D3 is formed in the corner portion of the outside wall 310, and by a tip surface 53 of the punch 5, the cut portion D4 is formed in the corner portion of the connection wall 330.

Next a method of manufacturing the door channel 30 will be described with reference to FIGS. 7A and 7B. First, the door channel 30 shown in FIG. 7A is disposed in the die 8. Then, by punching the corner portion C of the door channel 30 by the punch 5 from the inside (the side facing the door glass 2 shown in FIG. 1) of the door channel 30, the cut portion Da is formed in the corner portion C. Here, the punching process by the punch 5 is performed only once. In this way, the cut portion Da shown in FIG. 5 is formed in the corner portion C of the door channel 30.

As described above, according to the present embodiment, since the cut portion Da (the cut portion D3 and the cut portion D4) of the door channel 30 is formed by a single punching using the punch 5, the method of manufacturing the door channel 30 can be simplified. As described above, increase in the manufacturing cost of the door channel 30 can be suppressed in addition to the suppression of interference between the door channel 30 and another member (for example, the resin member 9).

Moreover, to surely fix the door channel 30 to the die 8, it is preferable to punch the corner portion C of the door channel 30 from the inside of the door channel 30. This is because when the corner portion C of the door channel 30 is punched from the outside of the door channel 30, the presence of a protruding portion 310a of the outside wall 310 makes it difficult to surely fix the die 8 and the door channel 30. However, it should be noted that the present embodiment does not exclude the process of punching the corner portion C of the door channel 30 from the outside of the door channel 3.

(Modification)

Figure 8:
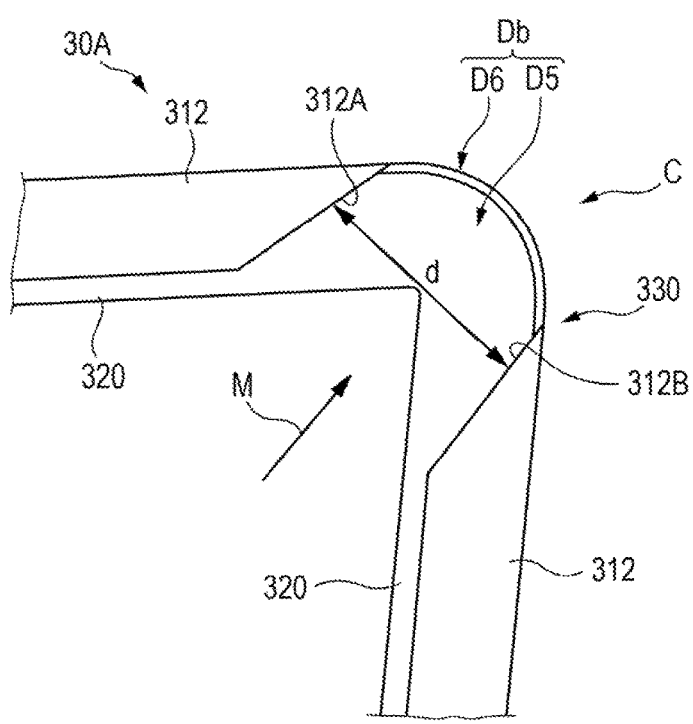
FIG. 8 is a plan view showing a door channel according to a modification of the present embodiment.

Next, a door channel 30A according to a modification of the present embodiment will be described with reference to FIG. 8., FIG. 8 is a plan view showing the door channel 30A according to the modification of the present embodiment. As shown in FIG. 8, the door channel 30A has an outside wall 312, the inside wall 320 and the connection wall 330. The door channel 30A according to the modification is different from the door channel 30 according to the present embodiment in that the shape of the cut portion formed to the corner portion C is different. In the following, the structure of the door channel 30A different from that a the door channel 30 will be described.

A cut portion Db is formed in the curved corner portion C of the door channel 30A. The cut portion Db hast cut portion D5 formed in the curved corner portion of the outside wall 312 and a cut portion D6 formed in the corner portion of the connection wall 330. By the cut portion D5, a cut surface 312A (first cut surface) and a cut surface 312B (second cut portion) facing each other are formed on the outside wall 310. Here, the cut surface 312A and the cut surface 312B are formed in such a manner that they are not parallel to each other and that the distance d between the cut surface 312A and the cut surface 312B gradually decreases along the movement direction M of the non-illustrated punch. According to this, interference between the door channel 30A and another member (for example, the resin member 9) can be appropriately suppressed. Moreover, the cut portion Db can be formed by a single punching process by the punch like the cut portion Da of the present embodiment. For example, by using a punch having a tapered tip portion, the cut portion Db can be formed in the corner portion C of the door channel 30A.

As described above, the exemplary embodiment and the modification are described in detail. However, the present invention is not limited to the above-described embodiment and the modification, and various modifications and replacements are applied to the above-described embodiment and the modifications without departing from the scope of claims.

What is claimed is:

1. A method of manufacturing a door channel that has an outside wall and a connection wall connected to the outside wall and is provided in a space defined between an inner panel and an outer panel of a vehicle door, the method comprising:
   (a) disposing the door channel in a die, the door channel including the outside wall and the connection wall connected to the outside wall and forming an angle with the outside wall; and
   (b) forming a cut portion in a corner portion of the door channel by punching the corner portion by a punch, wherein the cut portion includes:
   a first cut portion formed in a corner portion of the outside wall; and
   a second cut portion formed in a corner portion of the connection wall and communicating with the first cut portion,
   by the first cut portion, a first cut surface and a second cut surface facing each other are formed on the outside wall,
   by the second cut portion, a third cut surface is formed on the connection wall, the third cut surface forming an angle with the first cut surface and the second cut surface, and
   in the step (b), the first cut portion and the second cut portion are formed by a single punching.

2. The method of claim 1, wherein the first cut surface and the second cut surface are parallel to each other.

3. The method of claim 1, wherein a distance between the first cut surface and the second cut surface gradually decreases along a movement direction of the punch.

4. The method of claim 1, wherein the corner portion of the outside wall and the corner portion of the connection wall are curved, and
   the first cut portion is formed in an entire area of the corner portion of the outside wall.

5. The method of claim 1, wherein in the step (b), the corner portion of the door channel is punched from an inside of the door channel by the punch.

* * * * *